Patented May 8, 1934

1,957,852

UNITED STATES PATENT OFFICE 1,957,852

REFINING WHITE METAL SCRAP

Edmund H. Sheaff, Brooklyn, N. Y., assignor to National Lead Company, New York, N. Y., a corporation of New Jersey No Drawing. Application July 19, 1930,
Serial No. 469,256

11 Claims. (Cl. 75—17)

The invention relates to the refining of "white metal" alloys such as tin- or lead-base alloys, for the purpose of eliminating therefrom, or reducing therein, the proportions of certain ingredient metals regarded as undesirable or as impurities and commonly such as antimony, copper, arsenic and iron. Its object is to accomplish such removal, or reduction of proportions, with the least expense and with the use of simple apparatus and so that the values in the materials removed may be also easily recovered.

The process comprises, in general, first ascertaining, by test or otherwise, the existing proportions of such impurity metal or metals in the metal to be treated and then adding and mixing into the latter, while in a molten state, an appropriate amount of aluminum, commonly added in the form of flat or substantially flat pieces, such as the cuttings from aluminum sheets. Whether introduced in this form, or otherwise it is actively stirred into the metal, when the latter has reached the proper temperature, say 600° C. or 620° C. The solid pieces dissolve in the liquid metal before the melting point of the aluminum addition has been reached, and the stirring is continued until they have disappeared. The reaction is exothermic and results in chemical compounds of aluminum with the impurity metal or metals, which have a composition corresponding to the general formulas, $AlSb$, $AlCu_2$, etc., according as to which of the impurity metals were present in the original metal. So-called white metal scrap commonly contains a predominating portion of antimony which is thus, in most cases, the principal or only impurity to be removed.

Instead of adding the aluminum alone, an alloy of aluminum with another metal can be used in those cases where the introduction of the companion metal is not incompatible with the process or the result desired.

The amount of aluminum added, whether as straight aluminum or alloy, depends on the amount of impurities to be removed, and for complete removal of the ordinary run of the impurities mentioned is from two to three ninths of the amount of such impurities by weight, more or less, or slightly more than the theoretical combining power of aluminum with the particular impurity metal or metals, thus avoiding any substantial excess of aluminum after the reaction is complete. If the proportion of impurity metal or metals is merely to be reduced, as distinguished from complete elimination, the amount of aluminum addition is less and is regulated accordingly, the rule being that the added aluminum should not greatly exceed the combining power and where the impurity is principally antimony that the aluminum should be added in proportion to reduce it only to within .1% or .2% of the amount desired.

Following the aluminum reaction, the metal is cooled to a point below that at which the aluminum compounds referred to are soluble therein, namely around 300° C., being variable according to the tin content, if any, in the alloy and being lower as such tin content is larger, the practical rule being to cool to within about 100° C. of the freezing point of the metal. This causes the products of the reaction between the aluminum and the mentioned impurity metal or metals to separate sharply, in the form of a thick mush, floating on the metal. This mush holds all the compounds of aluminum with the impurity metal or metals as stated, and if aluminum has been added for complete elimination and properly stirred in, will be found to have cleared the original metal of such impurities down to a fraction of a per cent. or a trace.

The separation of the metal and mush, which is the next step, can be accomplished by skimming and draining, the skimmings being cast in ingots and later sweated to recover therefrom the portion of the original or "mother liquor" metal which adheres to the mush particles, or the mush can be separated from the liquid metal by filtering, which is preferred. Accordingly, the entire content of the kettle at the cooled temperature and with the mush still in it is passed through a filter, which latter may consist of any suitable container having a foraminous bottom, preferably removable, and having a charging entrance which can be closed so that fluid pressure, such as air pressure, can be used to force the metal through. The mush crystals compact against the perforated filter bottom and form the real filter medium, and after the bulk of the liquid has passed out, much of the residual metal which clings to and wets the mush particles can be blasted off by blowing air through the filter cake.

I have discovered that the presence of a combustible material, such as wood, introduced into, or allowed to char or burn in the presence of the mush greatly facilitates the removal of the liquid metal from it. After its first separation, in a filter or press, or otherwise, from the bulk of the purified metal, the hot mush may be placed on a board, in which event much of the adhering or wetting metal will run freely out of it as the result of the contact with the wood and the gases liberated by its destruction, or the mush may be placed in a filter or press, such as a Howard press, with wood pieces intermingled with it, whereupon a considerable portion of the wetting metal can be promptly pressed out or extracted. The wood may be brought into contact with the mush also in other ways and in various forms and other combustible materials such as coal have the same characteristic effect, although materials of vegetable character, like wood sawdust stirred into the mush work with lower mush temperatures, say, around 300 to 350° C. which is desirable. The amount of wood to be used is not critical and will ordinarily be from 1/10th to 1/4th of the amount of aluminum used to make the mush. The action of the wood is apparently due to change effected on the surface tension of the liquid metal. In this way, the initial percentage of original metal left clinging to the mush crystals after air drying, can be cut down by as much as 10%, and if the treatment is carried on to a sufficiently thorough extent will convert the mush to powder form from which the released metal is very easily separated, then to be restored to the main body of metal of which it was originally a part.

The small portion of aluminum remaining in the metal after filtering or separation from the mush, and which should not exceed .02 or .03%, is eliminated, according to this invention, by introducing or mixing with the still liquid metal, a proper portion of some material capable of reaction with aluminum in preference to the tin or lead or metals desired to remain in the product and adapted to produce a dross thereof which can be removed. It has been proposed to use sulfur for this purpose but I have found that other materials are superior to sulfur in that their use produces less loss by drossing. I may pour water onto the molten metal while at a temperature of say 350° C., thus removing the aluminum, but as this is dangerous for regular operation, I prefer to use a carbonaceous combustible material. I may use crushed anthracite or bituminous coal, stirring it into the metal when it has been raised to between 760° and 840°. The coal is allowed to rest on the surface at first, until ignited, and is then vigorously stirred in; it removes aluminum to a trace and with little loss of the metal being treated, and is easily applied. Wood sawdust has been found to be equivalent in action and its use permits lower temperature for the cleaning treatment. With care the sawdust will remove the last trace of aluminum, or, the final thousandth per cent. is sometimes cleared away by the use of a very small portion of sulfur stirred into the metal until a poured sample bar shows no surface trace of aluminum. It will be understood that the wood or carbonaceous material ignites readily when brought into contact with the molten metal and is accordingly in process of combustion when stirred wherein, and it is believed that the oxygen present in the combustion gases, for example $CO_2$ or possibly $CO$, exercises a preferential oxidation of the metallic aluminum, thereby accomplishing its removal as dross without seriously drossing the lead tin or other metals.

The dried mush, when dried by the aid of an introduced combustible, as above described, is a dark gray powder of marked characteristics. Being fine, it takes fire with great ease and burns at times with violence. Wet with water it generates hydrogen and with sufficient heat to make it catch fire in the air. In an ordinary case and when dried with the use of sawdust a typical composition is as follows:

| | Per cent |
|---|---|
| Impurity metal, Sb. etc. | 50 |
| Aluminum | 13 |
| Lead or tin or both | 35 |
| Charcoal | 2 | the proportion being of course subject to considerable variation with always the impurity metal or metals in predominance. From a commercial view the material is a new composition of matter constituting a useful medium in general smelting operations used as a reducing agent and is elsewhere claimed as such. It may be treated for the recovery of the valuable metals in it, for example by treating it in a reverberatory furnace in the presence of, or in contact with, the oxides or sulfides of certain metals such as those metals other than aluminum which the mush contains, viz., Sb, Sn, As or Cu. The reaction which is exothermic results in the reduction of the added oxide to metallic form and the production of an aluminum slag.

While it has been assumed above that all of the aluminum is introduced at once, it is also possible and in cases where the metal to be treated is high in impurity metals, it is preferable, to introduce it part at a time removing or filtering out the mush formed by each reaction before adding the next batch of aluminum and not necessarily cooling the kettle until the final batch has been thoroughly admixed. It will be apparent that the present invention is applicable also to this stage performance of the purifying process.

I claim:

1. In the purification of that class of alloys having predominating proportions of lead or tin with smaller amounts of antimony, arsenic, copper or iron therein as impurities, and in that process of purifying alloys of such class which comprises reacting with aluminum on a molten body of such alloy to produce a mush compound of aluminum with such impurity metal or metals, the step which comprises releasing the mother liquor metal which adheres to the particles of said mush compound by associating a carbonaceous material with said mush compound.

2. In the purification of that class of alloys having predominating proportions of lead or tin with antimony, arsenic, copper or iron present therein as impurities and in that process of purifying alloys of such class which comprises reacting with aluminum on a molten body of such alloy to produce a mush compound of aluminum with such impurity metal or metals, the step which comprises releasing the mother liquor metal which adheres to the particles of the mush compound by associating a woody material with such mush compound.

3. In the purification of that class of alloys having predominating proportions of lead or tin with antimony, arsenic, copper or iron present therein as impurities and in that process of purifying alloys of such class which comprises reacting with aluminum on a molten body of such alloy to produce a mush compound of aluminum with such impurity metal or metals, the steps which comprise filtering of the bulk of the mother liquor metal away from such mush compound while associating a carbonaceous material with the latter.

4. In the purification of that class of alloys having predominating proportions of lead or tin with antimony, arsenic, copper or iron present therein as impurities and in that process of purifying alloys of said class which comprises reacting with aluminum on a molten body of such alloy to produce a mush compound of aluminum with such impurity metal or metals, the step which consists in stirring carbonaceous material into said mush compound until the latter attains the condition of dry powder.

5. In the purification of that class of alloys which contains a predominating proportion of lead or tin with antimony, arsenic, copper or iron present therein as impurity, the process of purifying alloys of such class which comprises reacting with aluminum on a molten body of such alloy to produce a mush compound of the impurity metal and the aluminum, clearing the mush compound of the mother liquor metal which adheres thereto by associating therewith a carbonaceous material and treating the mother liquor metal so removed with carbonaceous material to remove residual aluminum therefrom.

6. In the purification of that class of alloys which has a predominating proportion of lead or tin with antimony, arsenic, copper or iron present therein as impurity, the process which comprises reacting with aluminum on a molten body of such alloy in amount predetermined with reference to the content of such impurity to produce therein a compound or compounds of aluminum with such impurity, cooling the mixture, separating the mush from the liquid metal and stirring carbonaceous material into said liquid metal until the residual aluminum therein is drossed off.

7. In the purification of that class of alloys which has a predominating proportion of lead or tin with antimony, arsenic, copper or iron present therein as impurity, the process which comprises reacting with aluminum on such alloy at a temperature sufficient to produce therein a compound or compounds of aluminum with said impurity metal or metals, cooling the mixture to a point below which said compounds are soluble in the liquid metal, separating the mush thereby produced from the liquid metal, covering the latter with carbonaceous material and when said material is ignited, stirring the same into said liquid metal.

8. In the purification of that class of alloys which has a predominating proportion of lead or tin with antimony, arsenic, copper or iron present therein as impurity, the process which comprises reacting with aluminum on a molten body of such alloy to produce therein a compound or compounds of aluminum with such impurity, separating the mush from the liquid metal, stirring carbonaceous material into said liquid metal until substantially all the residual aluminum therein is drossed off, and removing the remaining trace of aluminum by stirring a small amount of sulfur therein.

9. In the purification of alloys containing a predominating portion of lead or tin with antimony, arsenic, copper or iron present therein as impurity, the process which comprises stirring aluminum into a molten body of such alloy in proportion to combine with said impurities and form a mush therewith leaving a portion of the aluminum in the liquid metal, separating such liquid metal from the mush, and separating said remaining portion from the liquid metal by contacting a gaseous oxygen compound with such metal, said compound acting to oxidize the aluminum without any substantial oxidizing effect on the lead or tin with which it is associated.

10. The process of clearing aluminum contamination from lead or tin which comprises stirring carbonaceous material into the molten metal until the aluminum is substantially drossed off.

11. The process of separating metallic crystals from molten metal adhering thereto and forming a mush therewith which comprises stirring carbonaceous material into the mush thereby causing the liquid metal to drop away from the crystals.

EDMUND H. SHEAFF.